United States Patent

Kurtzberg et al.

Patent Number: 5,933,348
Date of Patent: Aug. 3, 1999

[54] METHOD FOR BIASING DESIGNS OF EXPERIMENTS

[75] Inventors: Jerome M. Kurtzberg; Menachem Levanoni, both of Yorktown Heights, N.Y.

[73] Assignee: International Business Machines Corporation, Armonk, N.Y.

[21] Appl. No.: 08/883,642

[22] Filed: Jun. 26, 1997

[51] Int. Cl.[6] .................................................. G06F 19/00
[52] U.S. Cl. ...................................... 364/468.09; 702/83
[58] Field of Search ...................... 364/148.01, 148.07, 364/468.01, 468.03, 468.09, 148.06, 149; 702/84, 83, 81; 706/83; 705/7

[56] References Cited

U.S. PATENT DOCUMENTS

| | | | |
|---|---|---|---|
| 5,253,331 | 10/1993 | Lorenzen et al. | 706/45 |
| 5,621,665 | 4/1997 | Ghosh et al. | 702/84 |

*Primary Examiner*—William Grant
*Assistant Examiner*—Steven R. Garland
*Attorney, Agent, or Firm*—Scully, Scott, Murphy & Presser; Stephen C. Kaufman, Esq.

[57] ABSTRACT

A method for biasing design of experiments. The method comprises the steps of determining a ranking of manufacturing process variables and their interaction; and, employing a biased experimental design utilizing the ranking of the manufacturing process variables and their interactions for the purpose of controlling a manufacturing process.

20 Claims, 2 Drawing Sheets

METHOD FOR BIASING DESIGNS OF EXPERIMENTS

FIELD OF THE INVENTION

This invention relates to a method for implementing industrial designs of experiments in which the importance of process variables may be taken into account.

INTRODUCTION TO THE INVENTION

An important inquiry related to manufacturing processes is to ascertain whether or not a process is in control or is out-of-control, to an end of effecting expedients for bringing an out-of-control process back into control.

Industrial design of experiment (DOE) concepts include known techniques for addressing the cited inquiry. The DOE techniques, in brief, may be utilized for arriving at proper specifications for new manufacturing processes, thereby enabling a recovery of an out-of-control process. For general further instruction on this point, reference may be made to Design and Analysis of Experiments, Douglas C. Montgomery, John Wiley & Sons, 1996.

SUMMARY OF THE INVENTION

Our work centers on a critique of the capabilities and viability of the foregoing representative DOE control techniques, to an end of disclosing novel methodology which can advantageously improve their performance.

In this regard, we note that all extant design of experiment techniques include as an underlying self-evident axiom, the notion that all process variables are considered to be of equal importance. As a result of this axiom, all known designs of experiment techniques are unbiased and do not (and can not) give preference to any one process variable or group of variables. At the same time, in practice, process engineers have knowledge of the relative importance of process variables, but this knowledge must be otiose with respect to the cited self-evident axiom.

We have discovered, in contrast to the extant techniques, that a suitable use of prior knowledge of process variables i.e., a biased construct, can be used for implementing a design of experiment technique subsuming such prior knowledge of process variables and manifesting, thereby, improved performance.

In accordance with our discovery, we disclose, first aspect, a method comprising the steps of:

(1) determining a ranking of manufacturing process variables and their interactions; and
(2) employing a biased experimental design utilizing the ranking of the manufacturing process variables and their interactions for the purpose of controlling a manufacturing process.

In a second aspect, we disclose a method for controlling manufacturing processes via biased experimental designs, so that prior knowledge of the importance of process variables and their interactions is taken into account, the method comprising the steps of:

(1) selecting a number of experimental design points n;
(2) selecting a desired maximum number of interactions among process variables to be included in the design;
(3) assigning weights to each of the process variables and all their interactions up to the maximum specified in step (2);
(4) ranking all process variables and their interactions according to their weights for creating a sorted list of decreasing weights;
(5) normalizing the weights so that they sum to unity;
(6) multiplying the normalized weights by the number of experimental points n specified in step (1) for obtaining the number of experimental design points assigned to each of the process variables and their selected interactions; and
(7) assigning values to each process variable and each selected interaction.

The invention as defined can realize significant advantages, with respect to the prior art design of experiment techniques, including inter alia:

(1) using prior knowledge of manufacturing processes in affecting an improved selection of experimental points;
(2) minimizing the number of experimental points by constraining them to a desired number and apportioning them to selected variables and interactions according to their ranking weights;
(3) modifying existing experimental designs by redistributing their experimental points in proportion to their importance; and
(4) automatically deleting insignificant variables and/or interactions from the design by assigning them no points.

BRIEF DESCRIPTION OF THE DRAWING

The invention is illustrated in the accompanying drawing, in which.

DETAILED DESCRIPTION OF THE INVENTION

Figure 1:
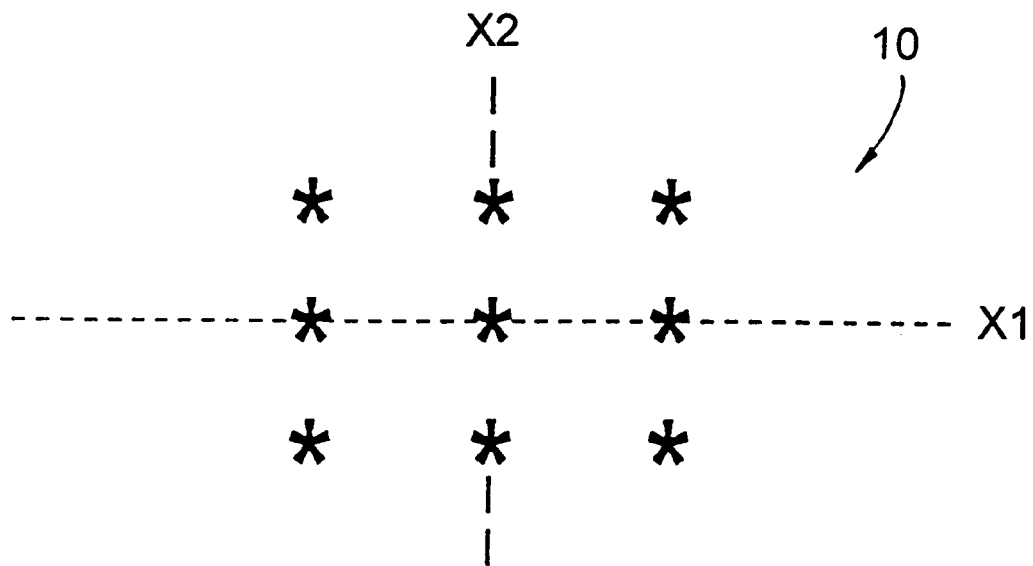
FIGS. 1 and 2 comprise respectively symmetric (unbiased) and asymmetric (biased) experimental designs in illustration of an Example of the present invention.

The detailed description of the invention proceeds by first setting forth a Summary of general considerations; then, secondly, articulating Preferred Aspects as especially referenced to the invention in its second aspect as set forth above; and, finally, disclosing an Example of the present invention.

SUMMARY

As disclosed above, one aspect of this invention comprises the ranking of process variables for the purpose of using this knowledge to implement an experimental design which can take advantage of prior process knowledge.

Another aspect of this invention is specifying the locations and values of the experimental points, based on the number, interactions-level, and ranking of process variables and their interactions, to arrive at an improved experimental design.

Accordingly, given that an existing manufacturing process requires the services of an experimental design in order that its performance may be improved, and given that prior knowledge of said process variables importance is known, the following procedure is preferably implemented:

(1) The total number of experimental points is selected. This is normally done via selection of a traditional experimental design, which dictates the number of experimental points.

It can also be selected by external conditions such as time limitations or financial constraints.

(2) The maximum level of process variables interactions is selected, commensurate with the total number of experimental points.

Process variables and their interactions (up to the maximum level) are given weights based on prior knowledge of the process.

(3) The total number of experimental points are distributed among the process variables and their interactions in proportion to their weights. Values are assigned to the experimental points in accordance with traditional methods or otherwise desirable values. This completes the design.

Preferred Aspects

The invention in its second aspect, as set forth above, comprises seven (7) steps.

Step (1) preferably comprises using prior knowledge of the process for selecting the number of experimental points, and preferably comprises using the number of experimental points as dictated by a known experimental design.

Step (2) preferably comprises cumulatively using at least one of main effects, 2-way interactions, 3-way interactions, or higher interactions, for selecting the maximum number of interactions to be included in the design.

Step (3) preferably comprises assigning weights based on prior knowledge of the manufacturing process, preferably based on computation of the respective correlations to process performance.

Step (4) preferably comprises removing parameters with weights less than a prescribed value, while step (5) preferably comprises normalizing each weight by dividing it by the sum of all weights.

Step (6) preferably comprises providing fractional values in said step (6) for obtaining integral values.

Step (7) preferably comprises assigning values to the selected variables and selected interactions according to the coding of a standard experimental design.

EXAMPLE

A manufacturing process has two variables. It is desired to implement an experimental design with no more than 10 points, with main effects and up to 2-way interactions, and use up to three levels for each variable. A traditional experimental design would be a 3-factorial design which calls for 3**2=9 experimental points. Coded values for three levels are −1, 0 and 1 so that the traditional (unbiased) 3-factorial design is:

X1 X2
−1 −1
−1 0
−1 1
0 −1
0 0
0 1
1 −1
1 0
1 1

This design is illustrated in FIG. 1, numeral 10. Note that this design is fully symmetric (unbiased) in the two variables.

Given that prior knowledge of the process specifies that the first variable (X1) has weight 10, the second (X2) has weight 4, and the interaction between X1 and X2 has weight 6, the normalized weights to the total of 20 are 0.5, 0.2 and 0.3 respectively. For 9 points the distribution is 4.5, 1.8 and 2.7 points which round off to 5 for X1, 2 for X2 and 3 for the interaction between X1 and X2 (a total of 10 points). Our invention, therefore, calls for a 10 points design:

X1 X2
−2 0
−1 0
0 0
1 0
2 0
0 −1
0 1
−1 −1
1 1
0 0

Figure 2:
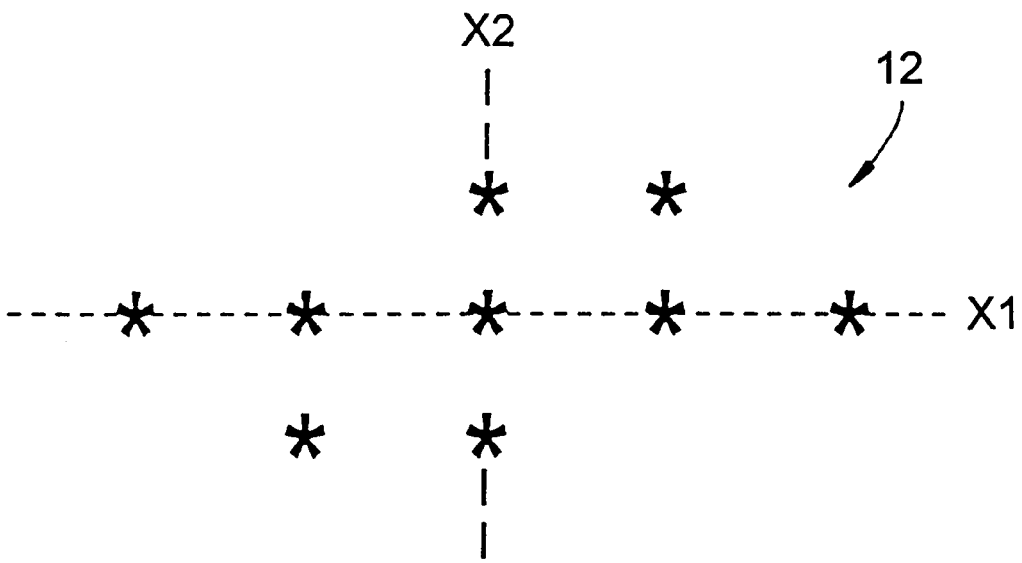

This design is illustrated in FIG. 2, numeral 12. Note that this design is asymmetric (biased) in the correct proportions for the two variables and their interaction.

Also note the repetition of the design at the origin (0,0). This is common practice in experimental designs, where experimental points are repeated for evaluation of process variability. Here it comes out automatically.

Figure 3:
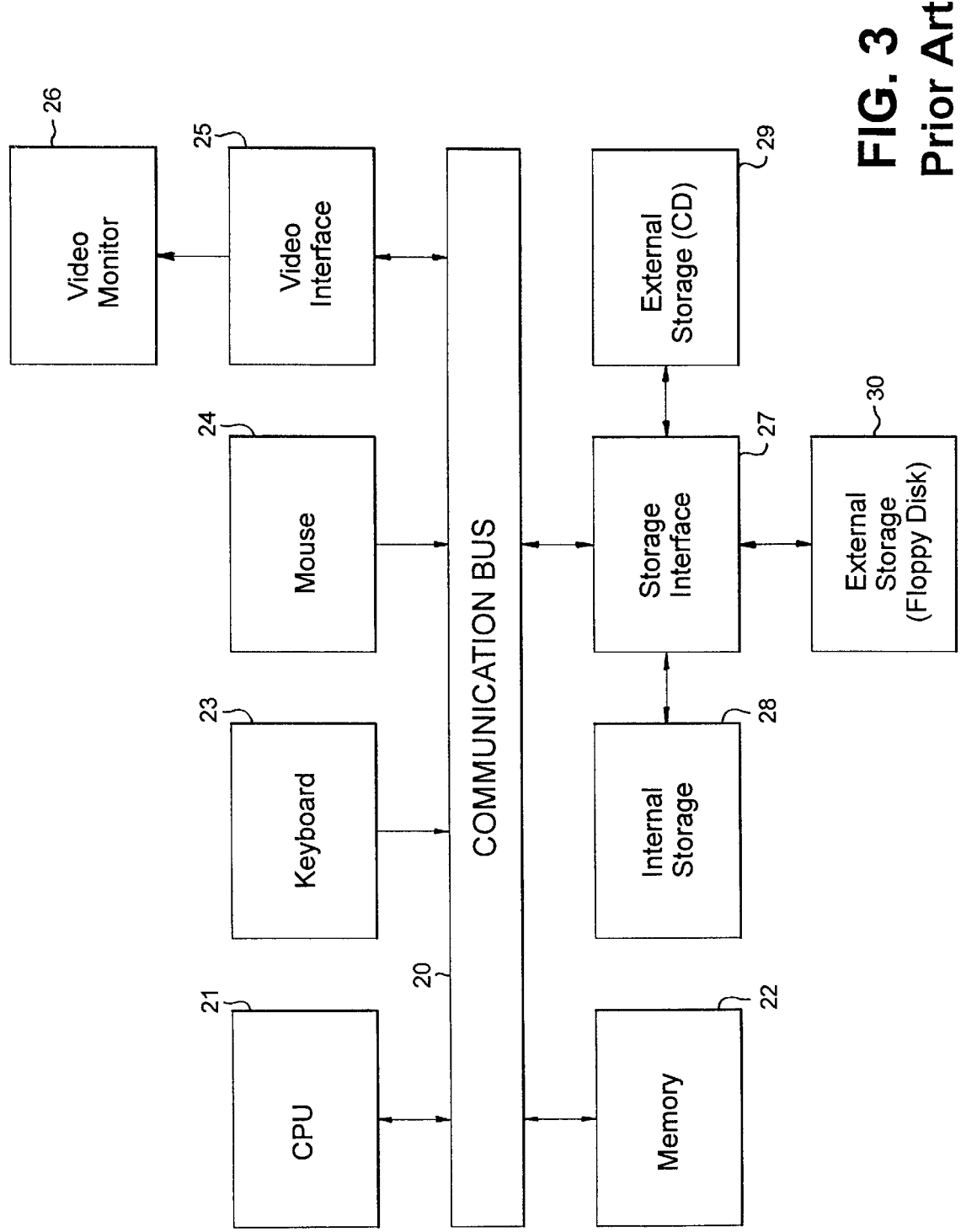
FIG. 3 is a diagram of a prior art machine on which industrial DOE methods may be implemented.

FIG. 3 shows a standard computer arrangement for implementing industrial DOE methods having a communication bus 20 connecting a CPU 21, a memory 22, a keyboard 23, a mouse 24, a video interface 25, and a storage interface 27. A video monitor 26 is connected to video interface 25, and internal storage 28, external storage 29, 30 connected to storage interface 27. The preceding description is offered only as an example of a possible arrangement. It will be understood by those skilled in the art that arrangement of computer components for implementation of industrial DOE methods may vary.

What is claimed is:

1. A method for optimizing an experimental design used in a manufacturing process, the method comprising the steps of:

(1) selecting a number of points for said experimental design;

(2) selecting a desired maximum number of interactions among process variables to be included in said experimental design;

(3) assigning weights to each of said process variables and all said interactions up to said maximum number;

(4) creating a sorted list of decreasing weights by ranking all said process variables and said interactions according to said weights;

(5) normalizing said weights to aggregate to unity;

(6) obtaining said points assigned to each of said process variables and said interactions by multiplying said normalized weights by said number of points; and (7) utilizing said obtained points to optimize said experimental design.

2. The method of claim 1, wherein prior knowledge of ranking of said process variables and said interactions is used for selecting said number of points.

3. The method of claim 1, wherein selection of said number of points is dictated by a known experimental design.

4. The method of claim 1, wherein selecting said desired maximum number comprises cumulatively using at least one of main effects including, 2-way interactions, 3-way interactions, multiple-way interactions.

5. The method of claim 1, wherein said weights are assigned based on prior knowledge.

6. The method of claim 1, wherein said weights are assigned based on a computation of respective correlations to process performance.

7. The method of claim 1, wherein step (4) further comprises removing said process variables and said interactions with weights less than a prescribed value.

8. The method of claim 1, wherein step (5) comprises normalizing each of said weights by dividing it by a sum of all weights.

9. The method of claim 1, wherein step (6) further comprises rounding fractional values for obtaining integral values.

10. The method of claim 1, wherein step (7) is performed according to the coding of a standard experimental design.

11. A computer program device readable by a machine, tangibly embodying a program of instructions executable by a machine to perform method steps for optimizing an experimental design used in a manufacturing process, the method comprising the steps of:

(1) selecting a number of points for said experimental design;

(2) selecting a desired maximum number of interactions among said process variables to be included in said experimental design;

(3) assigning weights to each of said process variables and all said interactions up to said maximum number;

(4) creating a sorted list of decreasing weights by ranking all said process variables and said interactions according to said weights;

(5) normalizing said weights to aggregate to unity;

(6) obtaining said points assigned to each of said process variables and said interactions by multiplying said normalized weights by said number of points; and (7) utilizing said obtained points to optimize said experimental design.

12. The method of claim 11, wherein prior knowledge of ranking of said process variables and said interactions is used for selecting said number of points.

13. The method of claim 11, wherein selection of said number of points is dictated by a known experimental design.

14. The method of claim 11, wherein selecting said desired maximum number comprises cumulatively using at least one of main effects including, 2-way interactions, 3-way interactions, multiple-way interactions.

15. The method of claim 11, wherein said weights are assigned based on prior knowledge.

16. The method of claim 11, wherein said weights are assigned based on a computation of respective correlations to process performance.

17. The method of claim 11, wherein step (4) further comprises removing said process variables and said interactions with weights less than a prescribed value.

18. The method of claim 11, wherein step (5) comprises normalizing each of said weights by dividing it by a sum of all weights.

19. The method of claim 11, wherein step (6) further comprises rounding fractional values for obtaining integral values.

20. The method of claim 11, wherein step (7) is performed according to the coding of a standard experimental design.

* * * * *

Disclaimer

5,933,348—Jerome M. Kurtzberg; Menachem Levanoni, both of Yorktown Heights, N.Y. METHOD FOR BIASING DESIGNS OF EXPERIMENTS Patent dated Aug. 3, 1999. Disclaimer filed Oct. 4, 2006, by the assignee, International Business Machines Corporation.

Hereby enter this disclaimer to all claims, of said patent.

*(Official Gazette, January 9, 2007)*